United States Patent
Heard et al.

(10) Patent No.: US 6,406,593 B1
(45) Date of Patent: Jun. 18, 2002

(54) MANUFACTURE OF PAPER AND PAPERBOARD

(75) Inventors: Michael Barry Heard; Gordon Cheng I Chen, both of Chesapeake, VA (US)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 0 days.

(21) Appl. No.: 09/704,351

(22) Filed: Nov. 2, 2000

Related U.S. Application Data

(60) Provisional application No. 60/164,231, filed on Nov. 8, 1999.

(51) Int. Cl.[7] .......................... D21H 17/42; D21H 17/45
(52) U.S. Cl. ................. 162/168.1; 162/168.3
(58) Field of Search ................... 162/127, 128, 162/164.1, 166, 168.1, 168.2, 168.3, 181.1, 181.6, 181.7, 181.8, 183, 175; 210/723, 732, 733, 734

(56) References Cited

U.S. PATENT DOCUMENTS

| | | | |
|---|---|---|---|
| 4,388,150 A | | 6/1983 | Sunden et al. ............. 162/175 |
| 5,126,014 A | * | 6/1992 | Chung .................... 162/164.6 |
| 5,167,766 A | * | 12/1992 | Honig et al. ............. 162/164.1 |
| 5,171,891 A | | 12/1992 | Masilamani et al. ........ 562/411 |
| 5,266,164 A | * | 11/1993 | Novak et al. ............. 162/168.2 |
| 5,393,381 A | | 2/1995 | Hund et al. ............... 162/168.3 |
| 5,482,693 A | | 1/1996 | Rushmere et al. ........ 423/328.1 |
| 5,882,525 A | | 3/1999 | Neff et al. ................ 210/735 |
| 6,071,379 A | * | 6/2000 | Wong Shing et al. ... 162/168.2 |
| 6,103,064 A | * | 8/2000 | Asplund et al. ......... 162/168.3 |

FOREIGN PATENT DOCUMENTS

| | | | |
|---|---|---|---|
| EP | 0 102 760 | 3/1984 | |
| EP | 0 126 528 | 11/1984 | |
| EP | 0 150 933 | 8/1985 | |
| EP | 0 235 893 | 9/1987 | |
| EP | 0 308 752 | 3/1989 | |
| EP | 0322234 | 6/1989 | ......... C08F/220/56 |
| EP | 0 335 575 | 10/1989 | |
| EP | 0 462 365 | 12/1991 | |
| EP | 0 484 617 | 5/1992 | |
| WO | 86/00100 | 1/1986 | |
| WO | 98/29604 | 7/1998 | |
| WO | 98/30753 | 7/1998 | |
| WO | 99/16708 | 4/1999 | |

OTHER PUBLICATIONS

EP 0 374 458 Nov. 1989 European Patent Application Neff et al.*

* cited by examiner

*Primary Examiner*—Peter Chin
*Assistant Examiner*—Eric Hug
(74) *Attorney, Agent, or Firm*—David R. Crichton

(57) ABSTRACT

A process of making paper or paper board comprising forming a cellulosic suspension, flocculating the suspension, mechanically shearing the suspension and optionally reflocculating the suspension, draining the suspension on a screen to form a sheet and then drying the sheet,
wherein the suspension is flocculated or reflocculated by introducing a water-soluble polymer of intrinsic viscosity above 3 dl/g into the suspension, characterized in that the water soluble polymer exhibits a rheological oscillation value of tan delta at 0.005 Hz of above 1.1. The process has the advantage of improving retention.

12 Claims, 1 Drawing Sheet

MANUFACTURE OF PAPER AND PAPERBOARD

Figure 1:
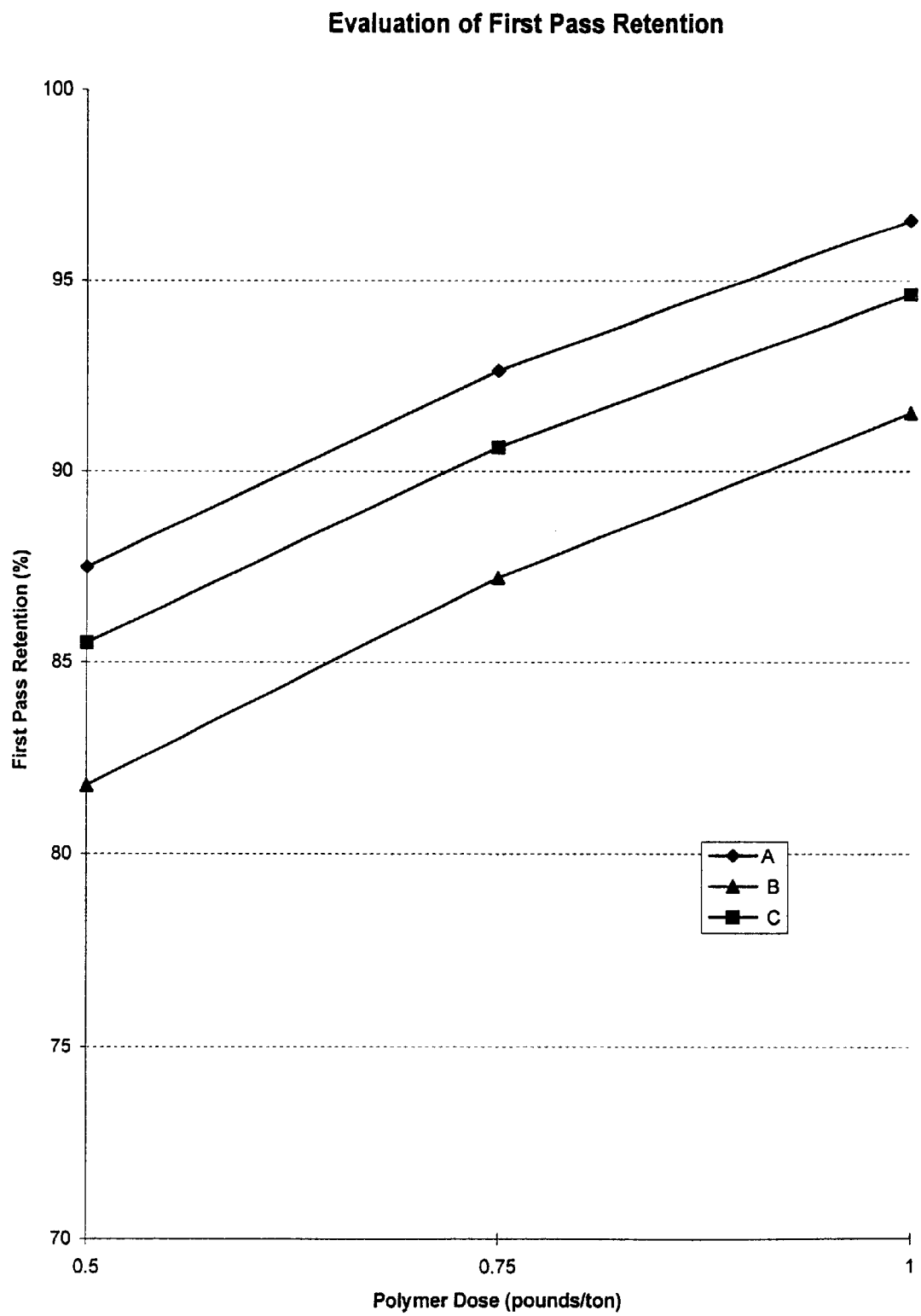

This application claims the benefit under 35 U.S.C. 119(e) of U.S. Provisional Application Serial No. 60/164,231, Filed Nov. 8, 1999.

This invention relates to processes of making paper and paperboard from a cellulosic stock, employing novel water soluble polymers as flocculating agents and also to the novel polymers used therein.

During the manufacture of paper and paper board a cellulosic thin stock is drained on a moving screen (often referred to as a machine wire) to form a sheet which is then dried. It is well known to apply water soluble polymers to the cellulosic suspension in order to effect flocculation of the cellulosic solids and enhance drainage on the moving screen.

In order to increase the output of paper many modern paper making machines operate at higher speeds. As a consequence of increased machine speeds a great deal of emphasis has been placed on drainage and retention systems that provide increased drainage, whilst maintaining optimum retention and formation. It is difficult to obtain the optimum balance of retention, drainage, drying and formation by adding a single polymeric retention aid and it is therefore common practice to add two separate materials in sequence.

EP-A-235893 provides a process wherein a water soluble substantially linear cationic polymer is applied to the paper making stock prior to a shear stage and then reflocculating by introducing bentonite after that shear stage. This process provides enhanced drainage and also good formation and retention. This process which is commercialised by Ciba Specialty Chemicals under the Hydrocol® trade mark has proved successful for more than a decade.

More recently there have been various attempts to provide variations on this theme by making minor modifications to one or more of the components. U.S. Pat. No. 5,393,381 describes a process in which a process of making paper or board by adding a water soluble branched cationic polyacrylamide and a bentonite to the fibrous suspension of pulp. The branched cationic polyacrylamide is prepared by polymerising a mixture of acrylamide, cationic monomer, branching agent and chain transfer agent by solution polymerisation.

U.S. Pat. No. 5882525 describes a process in which a cationic branched water soluble polymer with a solubility quotient greater than about 30% is applied to a dispersion of suspended solids, e.g. a paper making stock, in order to release water. The cationic branched water soluble polymer is prepared from similar ingredients to U.S. Pat. No. 5393381 i.e. by polymerising a mixture of acrylamide, cationic monomer, branching agent and chain transfer agent.

In WO 98/29604 a process of making paper is described in which a cationic polymeric retention aid is added to a cellulosic suspension to form flocs, mechanically degrading the flocs and then reflocculating the suspension by adding a solution of second anionic polymeric retention aid. The anionic polymeric retention aid is a branched polymer which is characterised by having a rheological oscillation value of tan delta at 0.005 Hz of above 0.7 or by having a deionised SLV viscosity number which is at least three times the salted SLV viscosity number of the corresponding polymer made in the absence of branching agent. Generally this branched anionic water soluble polymer is prepared by polymerising a water soluble anionic monomer or monomer blend in the presence of low levels of branching agent. The process provided significant improvements in formation by comparison to the earlier prior art processes.

EP-A-308752 describes a method of making paper in which a low molecular weight cationic organic polymer is added to the furnish and then a colloidal silica and a high molecular weight charged acrylamide copolymer of molecular weight at least 500,000. The disclosure appears to indicate that the broadest range of molecular weights afforded to the low molecular weight cationic polymer added first to the furnish is 1,000 to 500,000. Such low molecular weight polymers would be expected to exhibit intrinsic viscosities up to about 2 dl/g.

However, there exists a need to further enhance paper making processes by improving the retention and retaining or improving formation.

Thus the first aspect of the present invention relates to a process of making paper comprising forming a cellulosic suspension, flocculating the suspension, mechanically shearing the suspension and optionally reflocculating the suspension, draining the suspension on a screen to form a sheet and then drying the sheet, wherein the suspension is flocculated and/or reflocculated by introducing a water-soluble polymer of intrinsic viscosity above 3 dl/g into the suspension, characterised in that the water soluble polymer exhibits a rheological oscillation value of tan delta at 0.005 Hz of above 1.1.

The tan delta at 0.005 Hz value is obtained using a Controlled Stress Rheometer in Oscillation mode on a 1.5% by weight aqueous solution of polymer in deionised water after tumbling for two hours. In the course of this work a Carrimed CSR 100 is used fitted with a 6 cm acrylic cone, with a 1°58' cone angle and a 58 µm truncation value (Item ref 5664). A sample volume of approximately 2–3 cc is used. Temperature is controlled at 20.0° C.±0.1° C. using the Peltier Plate. An angular displacement of 5×10$^{-4}$ radians is employed over a frequency sweep from 0.005 Hz to 1 Hz in 12 stages on a logarithmic basis. G' and G" measurements are recorded and used to calculate tan delta (G"/G') values.

The value of tan delta is the ratio of the loss (viscous) modulus G" to storage (elastic) modulus G' within the system.

At low frequencies (0.005 Hz) it is believed that the rate of deformation of the sample is sufficiently slow to enable linear or branched entangled chains to disentangle. Network or cross-linked systems have permanent entanglement of the chains and show low values of tan delta across a wide range of frequencies, Therefore low frequency (e.g. 0.005 Hz) measurements are used to characterise the polymer properties in the aqueous environment.

It has surprisingly been found that polymers which exhibit a rheological oscillation value of tan delta at 0.005 Hz of above 1.1 provide improved performance in terms of improved retention and yet still maintain good drainage and formation performance. We find that polymers of high tan delta flocculate the cellulosic fibres and other components of the cellulosic paper making stock more efficiently thus inducing improvements in retention.

In a preferred form the water soluble polymer exhibits a rheological oscillation value of tan delta at 0.005 Hz of above 1.2 or 1.3. More preferably the polymer has an intrinsic viscosity of above 4 dl/g and a tan delta at 0.005 Hz of above 1.4 or 1.5. In some instances the tan delta may be as high as 1.7 or 1.8 or even as high as 2.0 or higher. Thus the polymer exhibits a high tan delta.

The high tan delta water soluble polymer may be anionic, nonionic, amphoteric but is preferably cationic. The polymer is prepared by polymerisation of a water soluble monomer or water soluble monomer blend. By water soluble we mean that the water soluble monomer or water soluble monomer blend has a solubility in water of at least 5 g in 100 ml of water. The polymer may be prepared conveniently by any suitable known polymerisation process for instance by solution polymerisation to provide an aqueous gel which is cut, dried and ground to form a powder or by reverse phase polymerisation as defined by EP-A-150933, EP-A-102760 or EP-A-126528.

The high tan delta water soluble polymer may be formed from a water soluble monomer or monomer blend comprising at least one cationic monomer and at least 2 ppm by weight, preferably 5 to 200 ppm, in particular 10 to 50 ppm of a chain transfer agent.

In the process of making paper according to the invention the water soluble polymer may be added to the paper making stock as the sole treatment agent in the paper making process, although preferably the polymer may be added as part of a multi-component flocculant system in which the invention the cellulosic suspension is flocculated and then reflocculated.

In one aspect of the invention the cellulosic suspension is flocculated by the water soluble polymer of tan delta at 0.005 Hz of above 1.1 and then the cellulosic suspension is reflocculated by a further addition of the water soluble polymer or alternatively by another flocculating material. Optionally the floccs formed are degraded before being reflocculated, by for instance applying mechanical shear. This can be for instance passing the flocculated cellulosic suspension through one or more shear stages such as a centri-screen or a fan pump etc.

In an alternative form of the invention the cellulosic suspension is flocculated by introducing a flocculating material and the cellulosic suspension is reflocculated by introducing the water soluble polymer of tan delta at 0.005 Hz of above 1.1. Optionally the floccs are degraded before reflocculation.

The cellulosic suspension may be flocculated by introducing the flocculating agent into the suspension at any suitable addition point. This may be for instance before one of the pumping stages or prior to the centri-screen or even after the centri-screen. The cellulosic suspension may then be reflocculated at any suitable point after it has been flocculated. The flocculating agent and reflocculating agent may be added in close proximity, for example without any shear stage between the additions. Preferably there is at least one shear stage (selected from cleaning, pumping and mixing stages) separating the addition of flocculating agent and reflocculating agent. Desirably when the flocculating agent is applied prior to a shear stage, for instance a fan pump or the centri-screen, the reflocculating agent may be added after that shear stage. This may be immediately after the shear stage or more usually further after. Thus the flocculating agent may be added prior to a fan pump and the reflocculating agent may be added after the centri-screen. Accordingly the high tan delta polymer is added as the flocculating agent and/or as the reflocculating agent.

Desirably the high tan delta water soluble polymer may be added to the stock at a dose of 0.01 to 10 pounds per ton (5 to 5000 ppm) based on dry suspension. Preferably the polymer is applied at 0.1 to 5 pounds per ton (50 to 2500 ppm), especially 0.4 to 2 pounds per ton (200 to 1000 ppm).

When the high tan delta water soluble polymer is used in a paper making process as part of a multi-component flocculating system, it may be added as the flocculating and/or reflocculating system. According to one preferred aspect of the invention the multi-component flocculating system comprises the high tan delta water soluble polymer and a different flocculating material. This flocculating material may be any of the group consisting of water soluble polymers, water-insoluble polymeric microbeads, particulate uncooked polysaccharides and inorganic materials. Suitable flocculating materials include inorganic materials such as siliceous materials, alum, polyaluminium chloride, aluminium chloro hydrate.

When the flocculating material is a water soluble polymer it may be any suitable water soluble polymer, for instance biopolymers, such as nonionic, anionic, amphoteric and cationic starches or other polysaccharides. The flocculating material may also be any suitable anionic, cationic, amphoteric or nonionic synthetic water soluble polymer.

The flocculating material may be a siliceous material which is in the form of an anionic microparticulate composition. The siliceous materials include silica based particles, silica microgels, colloidal silica, silica sols, silica gels, polysilicates, aluminosilicates, polyaluminosilicates, borosilicates, polyborosilicates, zeolites and clays. The clays are preferably swelling clays, for instance this may be typically a bentonite type clay. The preferred clays are swellable in water and include clays which are naturally water swellable or clays which can be modified, for instance by ion exchange to render them water swellable. Suitable water swellable clays include but are not limited to clays often referred to as hectorite, smectites, montmorillonites, nontronites, saponite, sauconite, hormites, attapulgites and sepiolites. The flocculating material may be bentonite as defined by EP-A-235895 or EP-A-335575.

Alternatively the flocculating material is a colloidal silica, selected from polysilicates and polyaluminosilicates. This includes polyparticulate polysilicic microgels of surface area in excess of 1000 $m^2/g$, for instance water soluble polyparticulate polyaluminosilicate microgels as described in U.S. Pat. No. 5,482,693 or aluminated polysilicic acid as described in U.S. Pat. No. 5,176,891 or WO-A-98/30753. In addition the flocculating material may be a colloidal silicic acid as described in U.S. Pat. No. 4,388,150 or a colloidal silica as described in W086/00100.

The flocculating material may also be a colloidal borosilicate, for instance as described in WO-A-99/16708. The colloidal borosilicate may be prepared by contacting a dilute aqueous solution of an alkali metal silicate with a cation exchange resin to produce a silicic acid and then forming a heel by mixing together a dilute aqueous solution of an alkali metal borate with an alkali metal hydroxide to form an aqueous solution containing 0.01 to 30% $B_2O_3$, having a pH of from 7 to 10.5.

In one form of the invention we provide a process of preparing paper from a cellulosic stock suspension comprising filler. The filler may be any of the traditionally used filler materials. For instance the filler may be clay such as kaolin, or the filler may be a calcium carbonate which could be ground calcium carbonate or in particular precipitated calcium carbonate, or it may be preferred to use titanium dioxide as the filler material. Examples of other filler materials also include synthetic polymeric fillers. Generally a cellulosic stock comprising substantial quantities of filler are more difficult to flocculate. This is particularly true of fillers of very fine particle size, such as precipitated calcium carbonate. Thus according to a preferred aspect of the present invention we provide a process for making filled paper. The paper making stock may comprise any suitable amount of filler. Generally the cellulosic suspension comprises at least 5% by weight filler material. Typically the amount of filler will be up to 40% or higher, preferably between 10% and 40% filler. The process provides a way of making paper incorporating high levels of filler, for instance up to 40% filler in the dry sheet.

The flocculating material used in conjunction with the high tan delta water soluble polymer, may be an anionic, nonionic, cationic or amphoteric branched water soluble polymer that has been formed from water soluble ethylenically unsaturated monomer or monomer blend and branching agent. For instance the branched water soluble polymer may exhibit a) an intrinsic viscosity above 1.5 dl/g and/or saline Brookfield viscosity of above about 2.0 mPa.s and b) a rheological oscillation value of tan delta at 0.005 Hz of above 0.7. Preferably the polymer may be a water soluble branched anionic polymer the anionic branched polymer has an intrinsic viscosity above 4 dl/g and a tan delta at 0.005 Hz of above 0.7, for instance as described in WO 98/29604.

Alternatively the flocculating material used in conjunction with the high tan delta water soluble polymer includes cross-linked anionic or amphoteric polymeric microparticles for instance as described in EP-A-462365 or EP-A484617.

A particularly preferred process employs a multi-component flocculation system comprising a cationic high tan delta water soluble polymer (i.e. rheological oscillation value of at least 1.1) flocculating agent and then as a reflocculating agent an anionic flocculating material. The anionic flocculating agent includes siliceous materials such as microparticulate silicas, polysilicates, anionic polymeric microbeads and water soluble anionic polymers, including both linear and branched water soluble polymers.

Particularly preferred high tan delta water soluble polymers for use in the paper making process include cationic polymers of intrinsic viscosity of at least 6 dl/g, for instance between 7 dl/g and 30 dl/g, more preferably 8 to 20 dl/g, particularly in the range 9 to 18 dl/g. Desirably the polymers exhibit a rheological oscillation value of tan delta at 0.005 Hz of between 1.3 and 2.0, preferably between 1.5 and 1.8.

Most preferably the cationic polymers are copolymers of acrylamide with the methyl choride quaternary ammonium salt of dimethylaminoethyl acrylate. The second aspect of the invention relates to a water-soluble polymer of intrinsic viscosity at least 3 dl/g, which has been formed from a water soluble monomer or water soluble monomer blend, characterised in that the cationic polymer exhibits a rheological oscillation value of tan delta at 0.005 Hz of above 1.1, preferably above 1.2 or 1.3. More preferably the polymer has an intrinsic viscosity of above 4 dl/g and a tan delta at 0.005 Hz of above 1.4 or 1.5. In some instances the tan delta may be as high as 1.7 or 1.8 or even as high as 2.0 or higher.

The polymer may be anionic, nonionic, amphoteric but is preferably cationic. The polymer is prepared by polymerisation of a water soluble monomer or water soluble monomer blend. By water soluble we mean that the water soluble monomer or water soluble monomer blend has a solubility in water of at least 5 g in 100 ml of water. The polymer may be prepared conveniently by any suitable polymerisation process.

When the water soluble polymer is nonionic the polymer may be formed from one or more water soluble ethylenically unsaturated nonionic monomers, for instance acrylamide, methacrylamide, hydroxyethyl acrylate, N-vinylpyrrolidone. Preferably the polymer is formed from acrylamide.

When the water soluble polymer is anionic the polymer is formed from one or more ethylenically unsaturated anionic monomers or a blend of one or more anionic monomers with one or more of the nonionic monomers referred to previously. The anionic monomiers are for instance acrylic acid, methacrylic acid, maleic acid, crotonic acid, itaconic acid, vinylsulphonic acid, allyl sulphonic acid, 2-acrylamido-2-methylpropane sulphonic acid and salts thereof. A preferred polymer is the copolymer of sodium acrylate with acrylamide.

Preferably the water soluble polymer is cationic and is formed from one or more ethylenically unsaturated cationic monomers optionally with one or more of the nonionic monomers referred to herein. The cationic polymer may also be amphoteric provided that there are predominantly more cationic groups than anionic groups. The cationic monomers include dialkylamino alkyl (meth) acrylates, dialkylamino alkyl (meth) acrylamides, including acid addition and quaternary ammonium salts thereof, diallyl dimethyl ammonium chloride. Preferred cationic monomers include the methyl chloride quaternary ammonium salts of dimethylamino ethyl acrylate and dimethyl aminoethyl methacrylate. A particularly preferred polymer includes the copolymer of acrylamide with the methyl chloride quaternary ammonium salts of dimethylamino ethyl acrylate.

Desirably the polymer may be prepared by reverse phase emulsion polymerisation, optionally followed by azeotropic dehydration to form a dispersion of polymer particles in oil. Alternatively the polymer may be provided in the form of beads by reverse phase suspension polymerisation, or as a powder by aqueous solution polymerisation followed by comminution, drying and then grinding.

The water soluble polymer may be formed from a water soluble monomer or monomer blend comprising at least one cationic monomer and chain transfer agent in an amount of at least 2 ppm by weight, often at least 5 ppm. The amount of chain transfer agent may be as much as 10,000 ppm but is usually not more than 2,500 or 3,000 ppm. Desirably the amount of chain transfer agent may be 5 to 200 ppm by weight, in particular 10 to 50 ppm by weight, of a chain transfer agent, based on weight of monomer.

The chain transfer agent may be any suitable chain transfer agent, for instance alkali metal hypophosphites, mercaptans such as 2-mercaptoethanol, malic acid or thioglycolic acid. Generally the amounts of chain transfer agent used would depend upon the efficiency of the particular chain transfer agent used. For instance desirable results may be obtained using around 5 to 25 ppm by weight thioglycolic acid, 10 to 50 ppm by weight alkali metal hypophosphite or 500 to 2,500 ppm by weight malic acid.

It is possible to include some branching agent with the monomer and chain transfer agent. However, it is more difficult to provide polymers with the desired rheological properties if branching agent is included. Therefore the amount of branching agent if included is preferably only included in very small quantities. Of particular preference are water soluble polymers prepared substantially in the absence of branching agent or cross-linking agent.

Particularly preferred polymers for use in the process of the invention include cationic polymers of intrinsic viscosity of between 6 dl/g and 18 dl/g, preferably 8 to 13 dl/g.

Desirably the polymers exhibit a rheological oscillation value of tan delta at 0.005 Hz of between 1.3 and 2.0, preferably between 1.5 and 1.8. Most preferably the cationic polymers are copolymers of acrylamide with the methyl choride quaternary ammonium salt of dimethylaminoethyl acrylate.

It is a feature of the present invention that the high tan delta polymers also have relatively high molecular weights as indicated by the high intrinsic viscosity values. One way of preparing the water soluble polymer is by solution polymerisation of an aqueous solution of the monomers. Generally the aqueous monomer solution should be between 20 and 40% concentration, preferably around 30 to 35%. The monomer solution should also include a chain transfer agent, for instance sodium hypophosphite. Care should be taken to use appropriate levels of chain transfer agent in combination with appropriate polymerisation conditions. If two much chain transfer agent is used the molecular weight of the polymer and thus intrinsic viscosity will tend to be too low. If insufficient chain transfer agent is used it may difficult to achieve the high tan delta values.

If sodium hypophosphite is used as the chain transfer agent, the amount can be as much as 200 ppm by weight, but is preferably in the range 10 to 100 ppm by weight, particularly 10 to 50 ppm. A suitable initiator system, for instance aqueous ammonium persulphate, sodium metabisulphite or tertiary butyl hydroperoxide, optionally with other initiators is introduced. When preparing gel polymers by solution polymerisation the initiators are generally introduced into the monomer solution. Optionally a thermal initiator system may be included. Typically a thermal initiator would include any suitable initiator compound that releases radicals at an elevated temperature, for instance azo compounds, such as azobisisobutyronitrile.

Once the polymerisation is complete and the polymer gel has been allowed to cool sufficiently the gel can be processed in a standard way by first comminuting the gel into smaller pieces, drying to the substantially dehydrated polymer followed by grinding to a powder.

Alternatively the polymers are produced as beads by suspension polymerisation or as a water-in-oil emulsion or dispersion by water-in-oil emulsion polymerisation, for example according to a process defined by EP-A-150933, EP-A-102760 or EP-A-126528.

The following examples demonstrate the invention.

EXAMPLE 1
Preparation of Polymer A

An aqueous monomer blend comprising 21 parts by weight dimethylaminoethyl acrylate methyl chloride quaternary ammonium salt, 79 parts by weight acrylamide 1750 ppm by weight of monomer diethylenetriaminepentaacetic acid, 3% by weight of monomer adipic acid and 50 ppm by weight sodium hypophosphite (chain transfer agent) was prepared in 100 parts by weight water.

The aqueous monomer blend is emulsified into 100 parts by weight Exxsol D40 hydrocarbon liquid containing 2.4% sorbitan monooleate, based on weight of monomer and 1.25% polymeric stabiliser EL 1599A (commercially available from Uniqema).

An amount of tertiarybutyl hydroperoxide (tBHP) and sodium metabisulphite are each added slowly at a rate sufficient to provide a 2° C. per minute temperature rise, typically this is between 5 and 15 ppm by weight of monomer.

Once the polymerisation is complete a substantial amount of the water from the dispersed phase and volatile solvent is removed by a dehydration step carried out at elevated temperature and reduced pressure.

Preparation of Polymers B to C

Polymers B and C are prepared as for Polymer A except using 0 and 20 ppm by weight sodium hypophosphite respectively.

Characterisation of Polymers A to C

Rheological oscillation value of tan delta at 0.005 Hz and intrinsic viscosity are determined for polymers A to C. The rheological oscillation values are measured on 2% aqueous solutions using an AR 1000N Rheometer. Instrinsic Viscosity is determined by preparing polymer solutions at various concentrations in 1N NaCl at 25° C. according to the the industry standard method. The results are shown in Table 1.

TABLE 1

| Polymer | ppm sodium hypophosphite | tanδ at 0.005 Hz | Intrinsic Viscosity (dl/g) |
| --- | --- | --- | --- |
| A | 50 | 1.82 | 8.5 |
| B | 0 | 0.94 | 14.7 |
| C | 20 | 1.21 | 10.9 |

EXAMPLE 2

First pass retention values are determined in a series of tests on fine paper laboratory stock using polymers A, B and C. For each test 0.2% solution of polymer is applied at 0.5, 0.75 and 1 pound per ton to the stock. The stock is then subjected to shearing using a mechanical stirrer followed by applying a slurry of activated bentonite at a dose of 4 pounds per ton.

Average first pass retention (%) results are shown as percentages in Table 2 and FIG. 1.

TABLE 2

| | Dose (pounds per ton) | | |
| --- | --- | --- | --- |
| Polymer | 0.5 | 0.75 | 1.0 |
| A | 87.50 | 92.60 | 96.60 |
| B | 81.80 | 87.20 | 91.50 |
| C | 85.50 | 90.70 | 94.60 |

It can clearly be seen that polymers A and C with tan delta values of 1.82 and 1.21 respectively have improved first pass retention by comparison to polymer B with a tan delta value of 0.94. Polymer A has the best first pass retention values.

EXAMPLE 3

A range of polymers is prepared in an analogous process to Example 1, in which three polymers were prepared using 0 ppm sodium hypophosphite chain transfer agent, three polymers were prepared using 20 ppm sodium hypophosphite and three polymers were prepared using 50 ppm sodium hypophosphite chain transfer agent, The intrinsic viscosities, rheological oscillation values are measured for each polymer. Example 2 is repeated for this range of polymers and the first pass retention values are determined.

The average results for each group of polymers for a given level of sodium hypophosphite is shown in Table 3.

TABLE 3

| ppm Na hypo-phosphite | Average Intrinsic Viscosity | Average tanδ at 0.005 Hz | Average First Pass Retention at a dose of 0.5 pounds/ton | Average First Pass Retention at a dose of 0.75 pounds per ton | Average First Pass Retention at a dose of 1 pound per ton |
|---|---|---|---|---|---|
| 0 | 13.90 | 0.92 | 83.10 | 88.70 | 93.50 |
| 20 | 12.90 | 1.12 | 85.60 | 90.80 | 94.30 |
| 50 | 10.50 | 1.40 | 87.40 | 92.70 | 95.60 |

It can clearly be seen that there is a trend to increasing retention values as the level of chain transfer agent in the polymers increases. The polymers with higher levels of chain transfer agent exhibit higher tan deltas.

EXAMPLE 4

Example 3 was repeated but for a range of polymers prepared using 0, 50, 100 and 150 ppm sodium hypophosphite. Average first pass retention values are shown in table 4.

TABLE 4

| ppm Na hypo-phosphite | Average Intrinsic Viscosity | Average First Pass Retention at a dose of 0.5 pounds/ton | Average First Pass Retention at a dose of 0.75 pounds per ton |
|---|---|---|---|
| 0 | 16.9 | 80.7 | 87.8 |
| 50 | 10.6 | 85.4 | 91.7 |
| 100 | 11.6 | 85.6 | 90.45 |
| 150 | 8.8 | 84.2 | 90.9 |

The results show that the polymers prepared in the presence of 50 to 150 ppm chain transfer agent show significantly improved first pass retention over the polymer prepared in the absence of chain transfer agent.

What is claimed is:

1. A process of making paper or paper board comprising forming a cellulosic suspension, flocculating the suspension, mechanically shearing the suspension and reflocculating the suspension, draining the suspension on a screen to form a sheet and then drying the sheet,
   wherein the suspension is flocculated by introducing a cationic water-soluble polymer that has been formed from a water-soluble monomer or monomer blend comprising at least one monomer, of intrinsic viscosity above 3 dl/g into the suspension,
   wherein in that the water soluble polymer exhibits a rheological oscillation value of tan delta at 0.005 Hz of above 1.1 (calculated on a 1.5% by weight aqueous solution of polymer),
   wherein the cellulosic suspension is reflocculated by introducing a flocculating material in which the flocculating material is an anionic branched water-soluble polymer that has been formed from water-soluble ethylenically unsaturated anionic monomer or monomer blend and branching agent and wherein the flocculating polymer has an intrinsic viscosity above 4 dl/g and a tan delta at 0.005 Hz of above 0.7 (calculated on a 1.5% by weight aqueous solution of polymer),
   wherein the mechanical shearing is achieved by passing the flocculated cellulosic suspension through one or more shear stages selected from a centriscreen and a fan pump.

2. A process according to claim 1 in which the water soluble polymer exhibits a rheological oscillation value of tan delta at 0.005 Hz of above 1.2 (calculated on a 1.5% by weight aqueous solution of polymer).

3. A process according to claim 1 in which the water soluble polymer has an intrinsic viscosity of above 4 dl/g and a tan delta at 0.005 Hz between 1.3 and 2.0 (calculated on a 1.5% by weight aqueous solution of polymer).

4. A process according to claim 1 in which the water soluble polymer is formed from a water soluble monomer or monomer blend comprising at least one cationic monomer and at least 2 ppm by weight of a chain transfer agent.

5. A process according to claim 4 in which the chain transfer agent is present in an amount of between 5 and 200 ppm by weight.

6. A process according to claim 1 in which the cellulosic suspension is flocculated and then reflocculated, in which the water soluble polymer of tan delta at 0.005 Hz of at least 1.1 is introduced as the flocculating agent and/or the reflocculating agent.

7. A process according to claim 4 in which the chain transfer agent is present in an amount of between 10 and 50 ppm by weight.

8. A process according to claim 1 in which the water soluble cationic polymer has an intrinsic viscosity of at least 6 dl/g.

9. A process according to claim 1 in which the flocculation and reflocculation is a multi-component flocculating system which comprises a different flocculating material selected from the group consisting of water-soluble polymers, water-insoluble polymeric microbeads, particulate uncooked polysaccharides and inorganic materials.

10. A process according to claim 9 in which the inorganic materials are selected from the group consisting of siliceous materials, alum, polyaluminum chloride, aluminum chloro hydrate.

11. A process according to claim 10 in which the siliceous material is selected from the group consisting of silica based particles, silica microgels, colloidal silica, silica sols, silica gels, polysilicates, aluminosilicates, polyaluminosilicates, borosilicates, polyborosilicates, zeolites and clays.

12. A process according to claim 11 in which the siliceous material is a water swellable clay, selected from the group consisting of hectorite, smectites, montmorillonites, nontronites, saponite, sauconite, hormites, attapulgites and sepiolites.

* * * * *